I

United States Patent
Nakano et al.

(10) Patent No.: US 10,759,358 B2
(45) Date of Patent: Sep. 1, 2020

(54) ELECTRONIC COMPONENT UNIT AND WIRE HARNESS

(71) Applicant: Yazaki Corporation, Tokyo (JP)

(72) Inventors: Ryo Nakano, Shizuoka (JP); Yukihiro Koyama, Shizuoka (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 311 days.

(21) Appl. No.: 15/869,158

(22) Filed: Jan. 12, 2018

(65) Prior Publication Data
US 2018/0229673 A1    Aug. 16, 2018

(30) Foreign Application Priority Data

Feb. 14, 2017 (JP) ................. 2017-024877

(51) Int. Cl.
*B60R 16/02* (2006.01)
*B60R 16/023* (2006.01)
*H02G 3/16* (2006.01)

(52) U.S. Cl.
CPC ...... *B60R 16/0207* (2013.01); *B60R 16/0238* (2013.01); *H02G 3/16* (2013.01)

(58) Field of Classification Search
CPC .... H02B 1/205; H01R 13/506; H01R 9/2408; H01R 9/2491; H01R 9/26; H01R 9/2608; H01R 9/2675; H02G 3/16
See application file for complete search history.

(56) References Cited

U.S. PATENT DOCUMENTS

| | | | | |
|---|---|---|---|---|
| 5,472,357 A | * | 12/1995 | Yamanashi | H01R 13/193 439/701 |
| 5,775,953 A | * | 7/1998 | Yamanashi | H01R 13/6273 439/357 |
| 6,022,247 A | | 2/2000 | Akiyama et al. | |
| 6,196,882 B1 | * | 3/2001 | Sato | H01R 9/2408 174/50 |
| 2006/0154532 A1 | * | 7/2006 | Yamada | B60R 16/0239 439/701 |
| 2014/0196925 A1 | * | 7/2014 | Kowtun | H02G 3/16 174/50 |
| 2017/0215291 A1 | * | 7/2017 | Tsubouchi | H01B 7/0045 |

FOREIGN PATENT DOCUMENTS

| | | |
|---|---|---|
| JP | 10-229621 A | 8/1998 |
| JP | 2003-209914 A | 7/2003 |
| JP | 2014-103724 A | 6/2014 |

OTHER PUBLICATIONS

Communication dated Feb. 19, 2019, issued by the Japan Patent Office in corresponding Japanese Application No. 2017-024877.

* cited by examiner

*Primary Examiner* — Oscar C Jimenez
(74) *Attorney, Agent, or Firm* — Sughrue Mion, PLLC

(57) ABSTRACT

An electronic component unit applicable to a wire harness includes: a plurality of blocks each including at least one main body portion to each of which an electronic component is attached, the blocks each including block-side joints for joining any two of the blocks to each other, the blocks being joined together via the block-side joints with the main body portions arranged side by side in a first direction with gaps between adjacent ones of the main body portions; and a supporting wall body including a plurality of wall-body side joints for supporting and fixing in a second direction intersecting the first direction, in a cantilever fashion, the blocks joined together via the block-side joints.

10 Claims, 12 Drawing Sheets

FIG.9
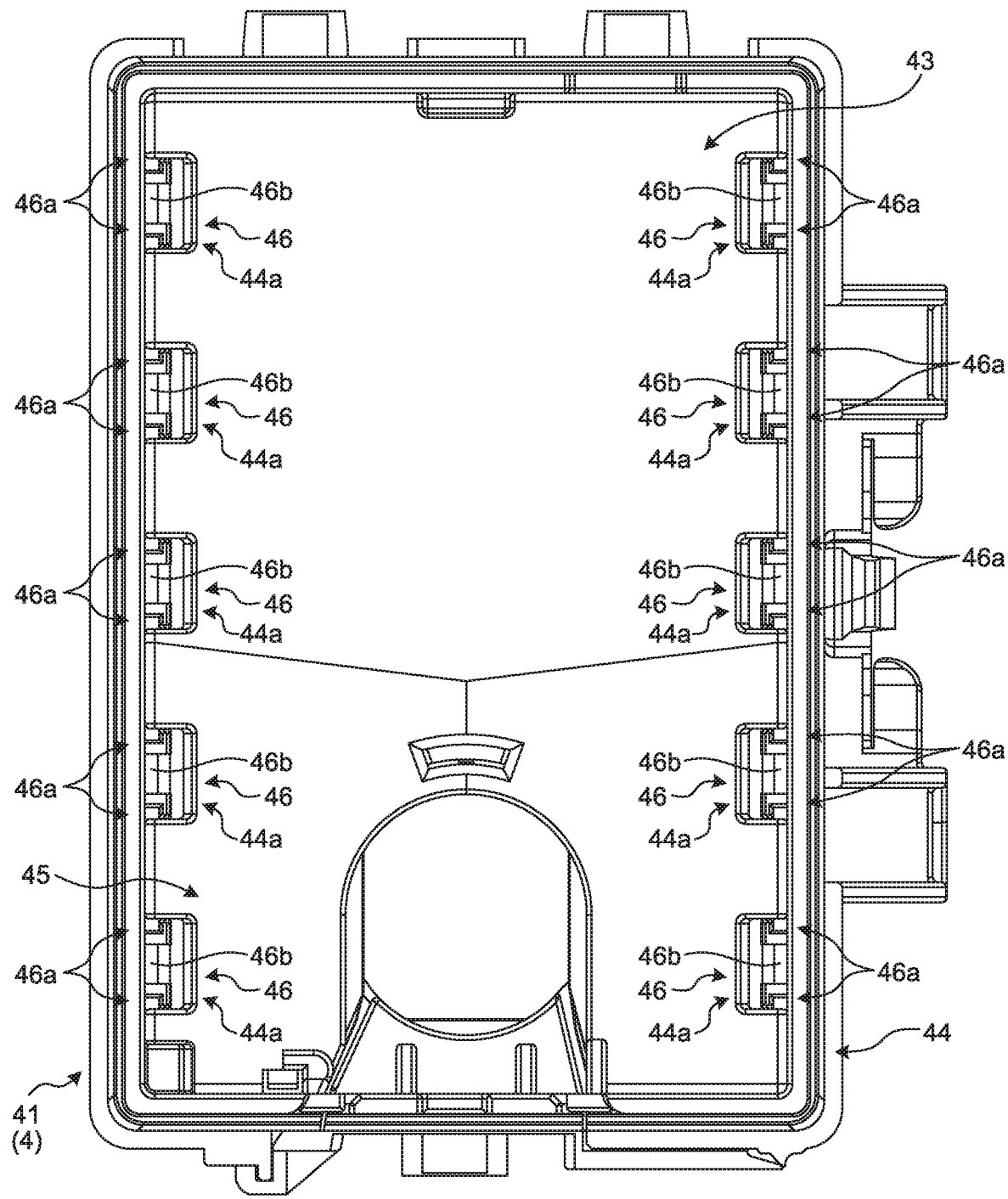
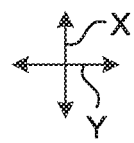

FIG.10
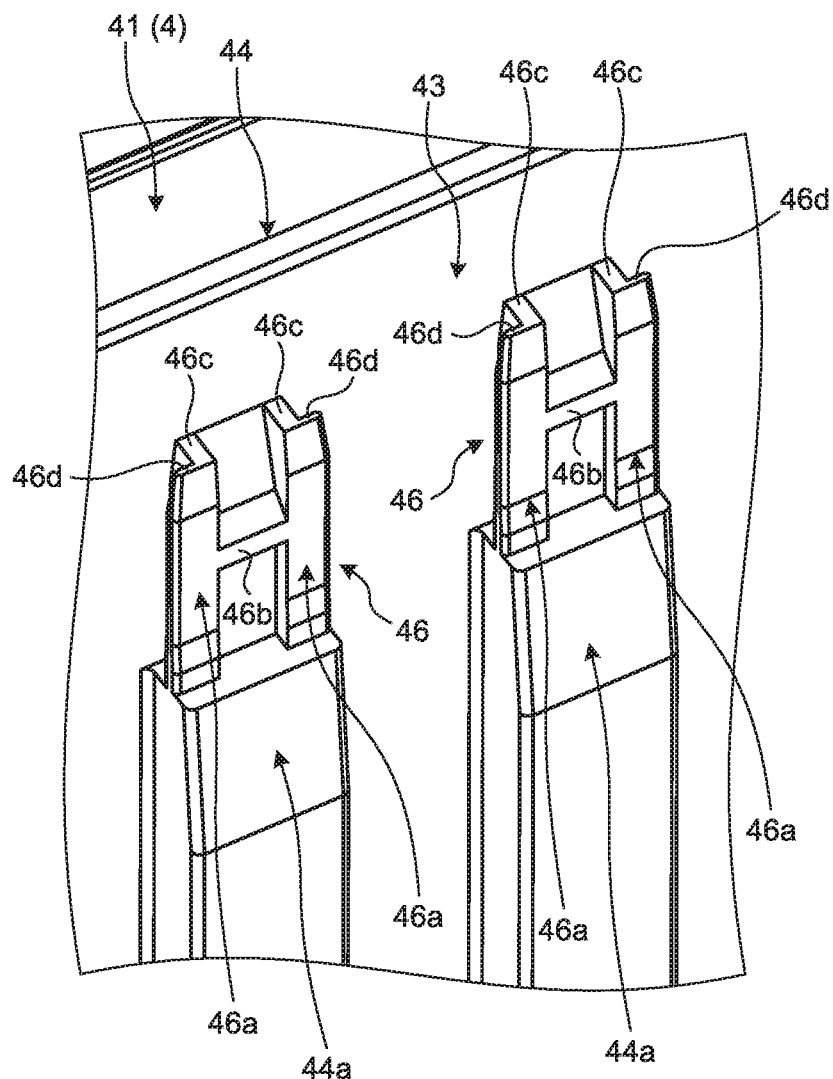
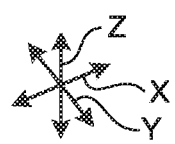

ELECTRONIC COMPONENT UNIT AND WIRE HARNESS

CROSS-REFERENCE TO RELATED APPLICATION(S)

The present application claims priority to and incorporates by reference the entire contents of Japanese Patent Application No. 2017-024877 filed in Japan on Feb. 14, 2017.

BACKGROUND OF THE INVENTION

1. Field of the Invention

The present invention relates to an electronic component unit and a wire harness.

2. Description of the Related Art

Examples of a conventional electronic component unit installed on equipment such as a vehicle include an electric wiring block disclosed in Japanese Patent Application Laid-open No. 2003-209914, the block internally housing a plurality of electronic components in the interior of a main body thereof while allowing the electronic components to be wired to each other. This electric wiring block has, on outside surfaces of the electronic components, connection means usable for joining these electronic components to each other. The electric wiring block has a block main body formed in a frame-like shape, and has, on the inner side of the block main body, fixation means by which the thus joined electronic components are fixed to that inner side.

The above-described electric wiring block disclosed in Japanese Patent Application Laid-open No. 2003-209914, however, has room for improvement, for example, in terms of appropriate installation of electronic components that allows for tolerance absorption of the individual members, antivibration measures that work when a vehicle vibrates, and the like.

SUMMARY OF THE INVENTION

The present invention has been made in view of the situations described above, and is directed to providing an electronic component unit and a wire harness that enable electronic components to be properly installed.

In order to achieve the above mentioned object, an electronic component unit according to one aspect of the present invention includes a plurality of blocks each including at least one main body portion to each of which an electronic component is attached, and block-side joints that join any two of the blocks to each other, the blocks being joined together via the block-side joints with the main body portions arranged side by side in a first direction with gaps between adjacent ones of the main body portions; and a supporting wall body including a plurality of wall-body side joints that support and fix in a second direction intersecting the first direction, in a cantilever fashion, the blocks joined together via the block-side joints.

According to another aspect of the present invention, in the electronic component unit, it is possible to configure that the wall-body side joints join the blocks to the supporting wall body with a distance between each of the main body portions and the supporting wall body in the second direction being smaller than a distance in the first direction between the main body portions that are joined together via the block-side joints.

According to still another aspect of the present invention, in the electronic component unit, it is possible to configure that each of the block-side joints, while the blocks are in a state fixed to the supporting wall body via the wall-body side joints, is positioned offset towards one side from a center position of the corresponding main body portion in the second direction, the one side facing away from the supporting wall body.

According to still another aspect of the present invention, in the electronic component unit, it is possible to configure that the block-side joints include first joints and second joints, the first joints each being capable of engaging with and stopping against the second joint, the blocks include two or more of the first joints and two or more of the second joints, each of the wall-body side joints is capable of engaging with and stopping any one of the first joints, each of the first joints includes an engagement projection that engages with and stops against any one of the second joints or any one of the wall-body side joints, and each of the main body portions includes a notch that penetrates through each of the main body portions in a third direction from the corresponding engagement projection towards the electronic component, the third direction intersecting the first direction and the second direction.

In order to achieve the above mentioned object, a wire harness according to still another aspect of the present invention includes an electrically conductive wiring member; and an electronic component unit electrically connected to the wiring member, wherein the electronic component unit includes: a plurality of blocks each including at least one main body portion to each of which an electronic component electrically connected to the wiring member is attached, and block-side joints that join any two of the blocks to each other, the blocks being joined together via the block-side joints with the main body portions arranged side by side in a first direction with gaps between adjacent ones of the main body portions, and a supporting wall body including a plurality of wall-body side joints that support and fix in a second direction intersecting the first direction, in a cantilever fashion, the blocks joined together via the block-side joints.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a plan view illustrating a schematic configuration of a lower cover of the electrical connection box according to the embodiment;

FIG. 10 is a partial sectional perspective view illustrating a schematic configuration of a wall-body side joint of the electrical connection box according to the embodiment;

DETAILED DESCRIPTION OF THE PREFERRED EMBODIMENTS

The following describes an embodiment according to the present invention in detail based on the drawings. This embodiment is not intended to limit the invention. Components included in the following embodiments may include a component that the skilled person can easily replace with a different component, and may include components substantially the same as each other.

Figure 1:
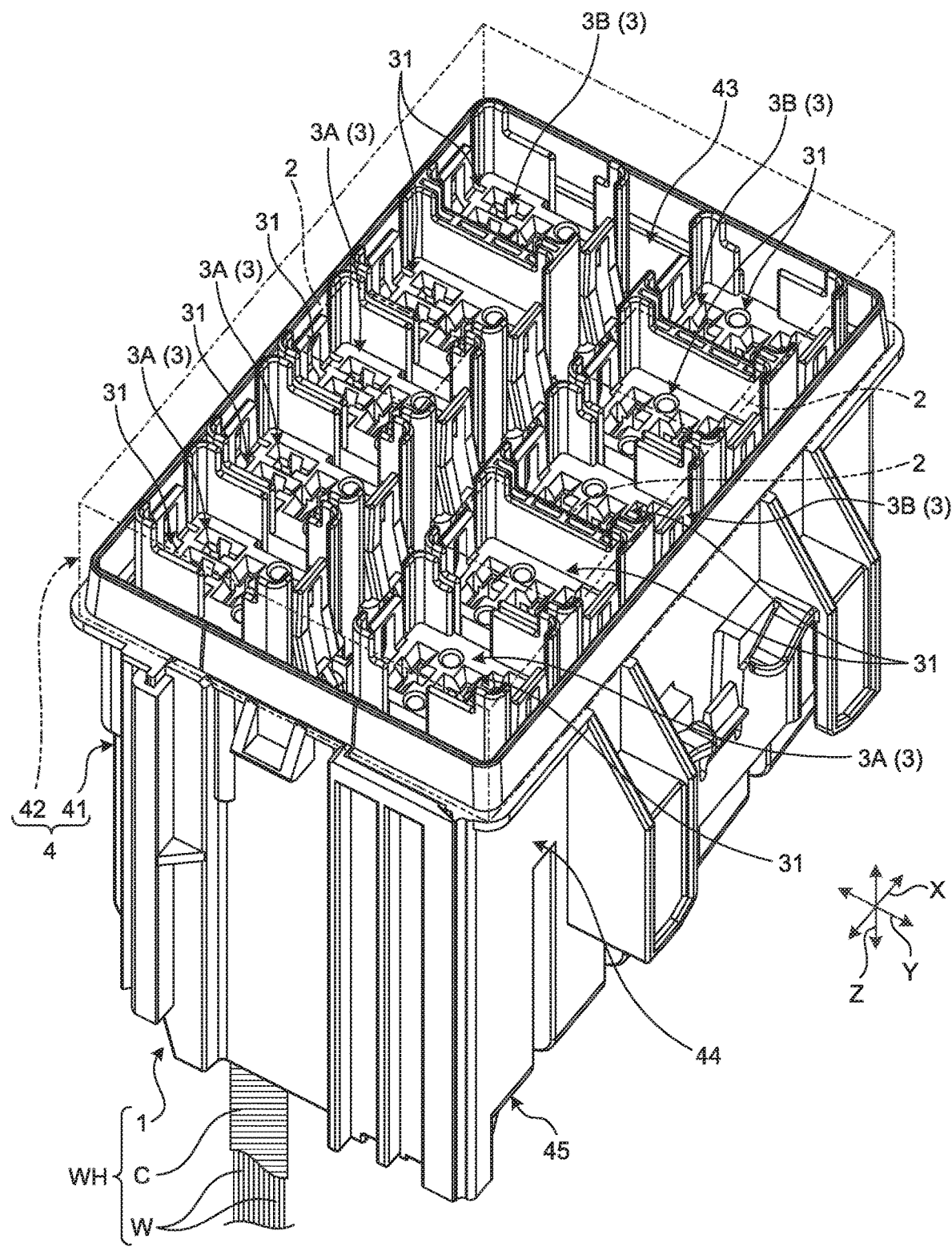
FIG. 1 is a perspective view illustrating a schematic configuration of an electrical connection box according to an embodiment.

While FIG. 1 transparently illustrates an upper cover with a dashed two-dotted line, the other drawings do not illustrate the upper cover at all. While FIGS. 1, 4, and 5 transparently illustrate some of electronic components with dashed two-dotted lines, the other drawings do not illustrate any electronic components at all. FIG. 1 partially illustrates some parts of a wiring member and an outer covering, FIG. 6 does not fully illustrate wiring members and terminals but indicate some of them by dashed two-dotted lines, and the other drawings do not illustrate any wiring members, outer coverings, and terminals at all. In the following description, a first direction, a second direction, and a third direction that intersect each other are referred to as a "first width direction X", a "second width direction Y", and a "height direction Z", respectively. The first width direction X, the second width direction Y, and the height direction Z are perpendicular to each other. In the following description, one side in the height direction Z to which an upper cover to be described later is provided may be referred to as an upper side, and the other side to which the lower cover to be described later is provided may be referred to as a lower side. Unless otherwise stated, directions used in the following description indicate directions under the condition that an electrical connection box has been installed on the vehicle with parts thereof in an assembled state.

Embodiment

Figure 2:
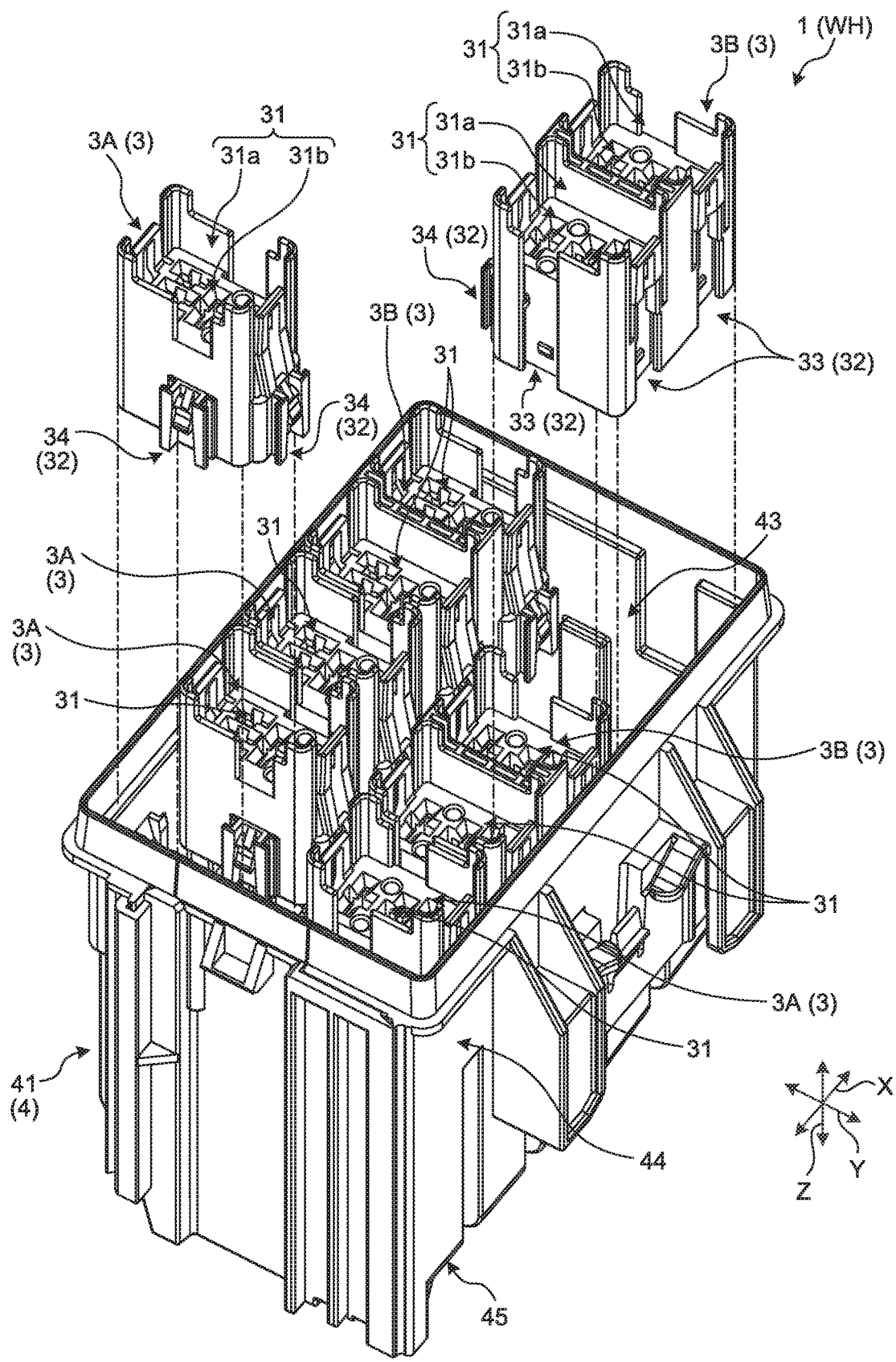
FIG. 2 is an exploded perspective view illustrating the schematic configuration of the electrical connection box according to the embodiment.
Figure 3:
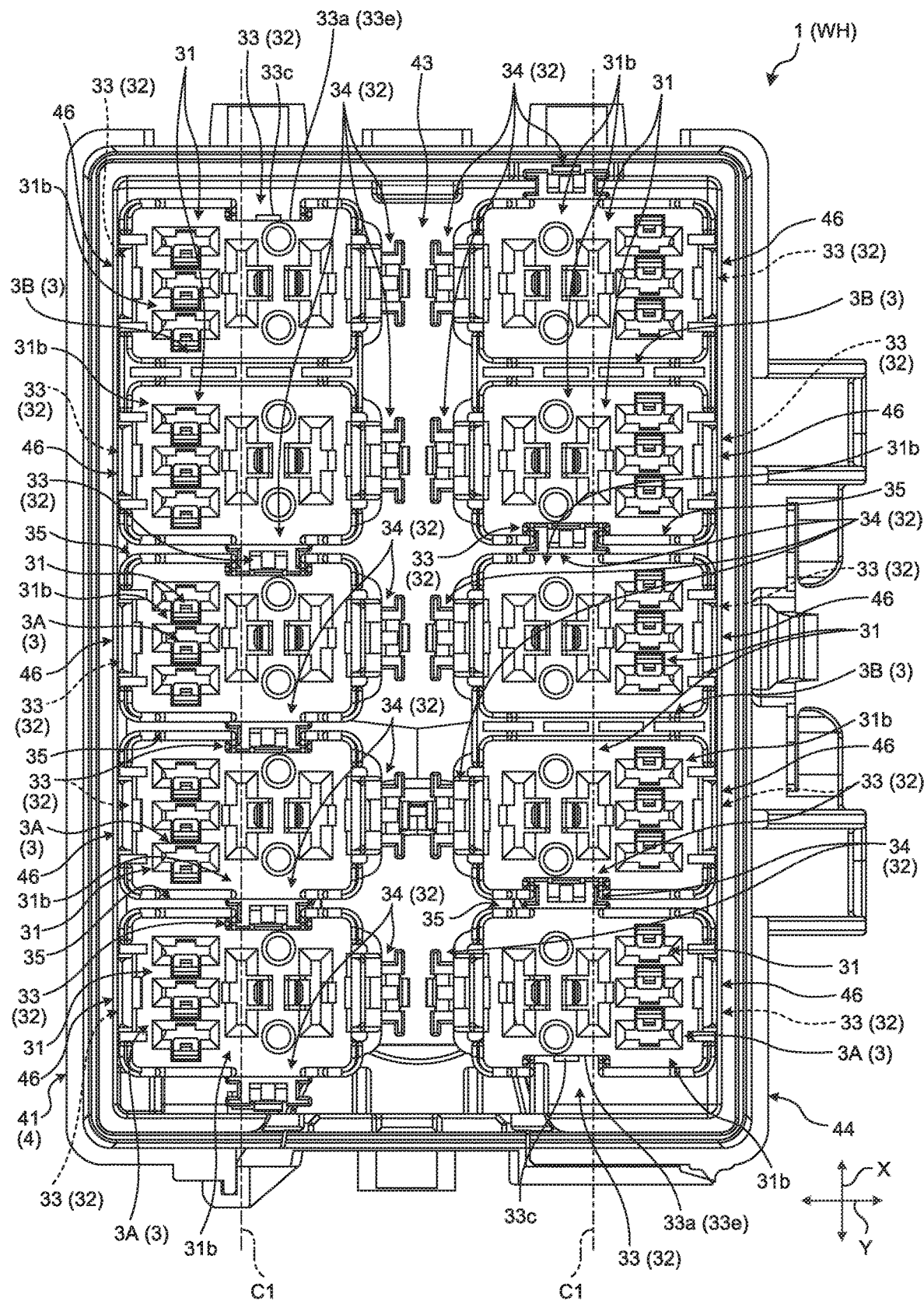
FIG. 3 is a plan view illustrating the schematic configuration of the electrical connection box according to the embodiment.

An electrical connection box 1 illustrated in FIGS. 1 to 3 as an electronic component unit according to this embodiment is installed on a vehicle such as an automobile and incorporated into a wire harness WH. The wire harness WH is, for example, an assembled component obtained by bundling a plurality of wiring members W to enable connection between devices installed on the vehicle, the assembled component being configured so that the wiring members W can be connected to corresponding devices via connectors or the like, the wiring members W being usable for powering and signal transmission. The wire harness WH includes: electrically conductive wiring members W, an outer covering C through the interior of which the wiring members W are inserted; and the electrical connection box 1 electrically connected to the wiring members W. Each of the wiring members W is, for example, a metal rod, an electric wire, or a bundle of electric wires. The metal rod is composed of: an electrically conductive rod-like member; and an insulative covering that covers the outside of the electrically conductive rod-like member. The electric wire is composed of: a conductive body (core wire) formed of a plurality of electrically conductive metal raw wires; and an insulative covering that covers the outside of the conductive body. The bundle of electric wires is a bundle of such electric wires. The outer covering C is externally worn by the wiring members W and protects the wiring members W, and is, for example, a corrugated tube formed of an insulative resin material and in a flexible, substantially cylindrical shape. The wire harness WH bundles and consolidates the wiring members W and electrically connects to the electrical connection box 1 via terminals and connectors provided at the end of the bundled wiring members W. The wire harness WH may further include a grommet, a protector, or a fixation tool.

The electrical connection box 1 collectively houses electric components such as a connector, a fuse, a relay, a capacitor, a bifurcation, and an electronic control unit internally. The electrical connection box 1 is installed in, for example, an engine room of the vehicle or a vehicle interior. The electrical connection box 1 connects between a power supply such as a battery and each of the various electronic devices installed on the vehicle through the wiring members W and the like. The electrical connection box 1 distributes electric power from the power supply to the various electronic devices in the vehicle. While the electrical connection box 1 may be referred to as a junction box, a fuse box, a relay box or the like, the term "electrical connection box" is used herein to generally represent these terms.

The electrical connection box 1 of this embodiment includes electronic components 2, a plurality of blocks 3, and a casing 4. In the electrical connection box 1, the electronic components 2 are set in the blocks 3 and then housed inside the casing 4. The electrical connection box 1 of this embodiment then has a plurality of such blocks 3 joined together side by side in the first width direction X and supported and fixed by the casing 4 in a cantilever fashion in the second width direction Y. This configuration enables the electrical connection box 1 of this embodiment to have a configuration such that the electronic components 2 can be properly installed. Hereinafter, the configurations of respective elements of the electrical connection box 1 are described in detail with reference to the drawings.

The electronic component 2 is an element to be housed inside the casing 4 while being attached to any one of the blocks 3 and to be connected to the wiring member W. More than one such electronic component 2 is provided. The electronic component 2 is, for example, a connector, a fuse, a relay, a capacitor, a bifurcation, a transistor, an electronic control unit, or an electronic component unit that has these components unitized therein. Herein, the electronic component 2 is, for example, a relay.

As illustrated in FIGS. 1 to 6, the block 3 is an element to have the electronic component 2 is attached thereto and be detachably attached to the casing 4. The block 3 is formed of insulative synthetic resin as is a lower cover 41 to be described later. More than one such block 3 is provided in the casing 4. The blocks 3 have configurations that enable them to be joined together. The blocks 3 of this embodiment include at least one first block 3A and at least one second block 3B that differ from each other in number of attachable electronic components 2. The first block 3A illustrated in FIG. 4 can have a single electronic component 2 attached thereto. The second block 3B illustrated in FIG. 5 can have two electronic components 2 attached thereto. For the electrical connection box 1 of this embodiment, the first block 3A and the second block 3B, for example, are standardized and made shareable as far as possible regardless of which type of vehicle and which type of platform the electrical connection box 1 is applied to, for example. For the electrical connection box 1 of this embodiment, the at least one first block 3A and the at least one second block 3B are properly selected on the basis of the type of vehicle and the type of platform the electrical connection box 1 is applied to, for example. This configuration enables the electrical connection box 1 to allow for both enhanced versatility through standardization and sharing of members and optimization through diversified selection of members in a balanced manner, and to consequently correspond to various types of vehicle and various types of platform. The electrical connection box 1 of this embodiment includes four first blocks 3A and three second blocks 3B as the blocks 3 and can be provided with 10 electronic components 2 in total. The following description of the electrical connection box 1 may refer to either the first block 3A or the second block 3B simply as the block 3 when no distinction is needed therebetween.

Each of the blocks 3 includes at least one main body portion 31 and at least one block-side joint 32, which are integrally formed. The main body portion 31 is a part to which the electronic component 2 is attached. The first block 3A has a single main body portion 31. In the first block 3A, one electronic component 2 can be attached to this single main body portion 31. The second block 3B has two main body portions 31, and these two main body portions 31 are integrally formed adjacently and continuously to each other. In the second block 3B, one of the electronic components 2 can be attached to one of these two main body portions 31, so that a total of two electronic components 2 can be attached. The block-side joints 32 are parts via which the main body portions 31 can be joined to each other. Some of the block-side joints 32 herein are used for engagement with the casing 4.

Figure 4:
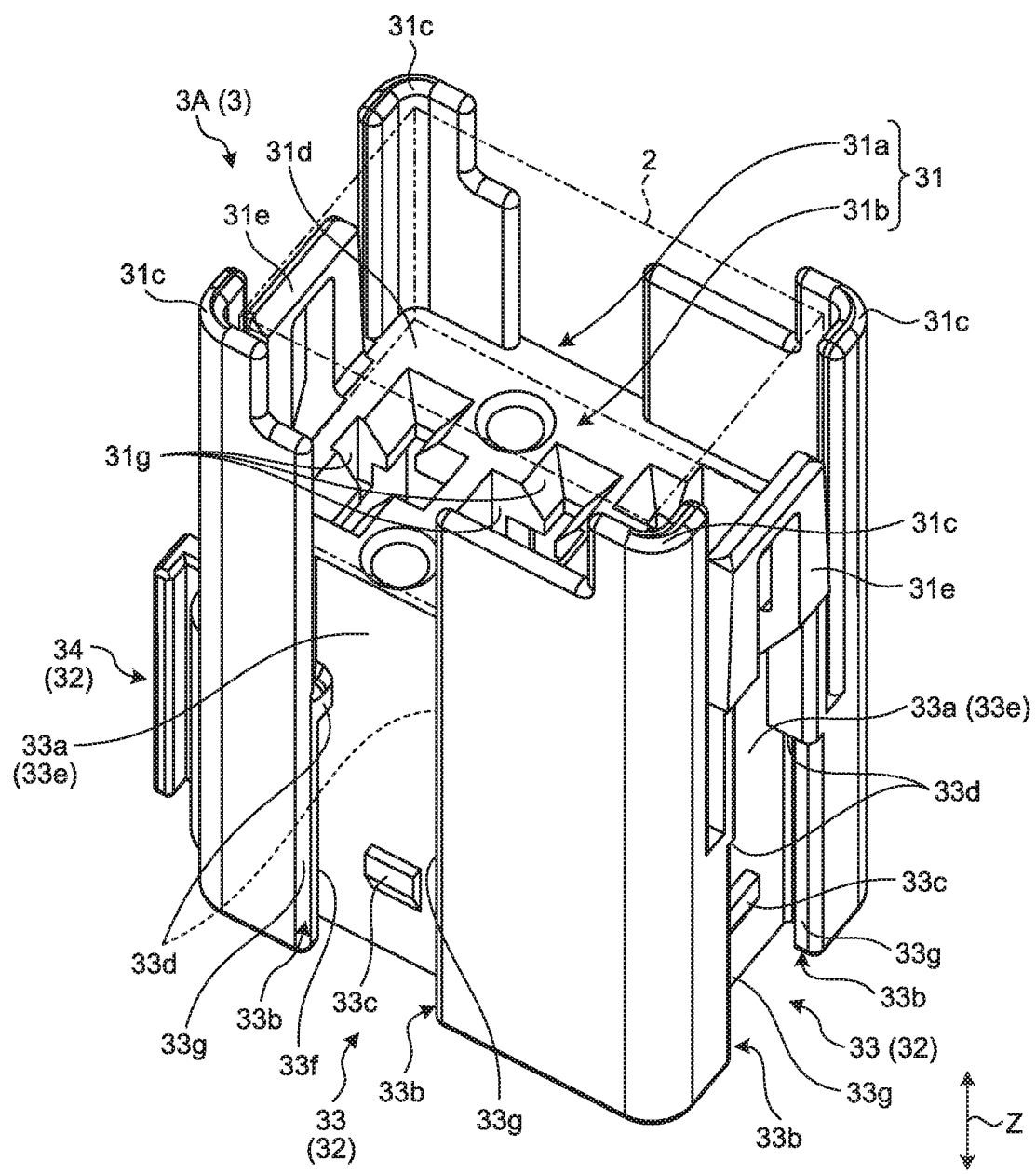
FIG. 4 is a perspective view illustrating a schematic configuration of a first block of the electrical connection box according to the embodiment.
Figure 5:
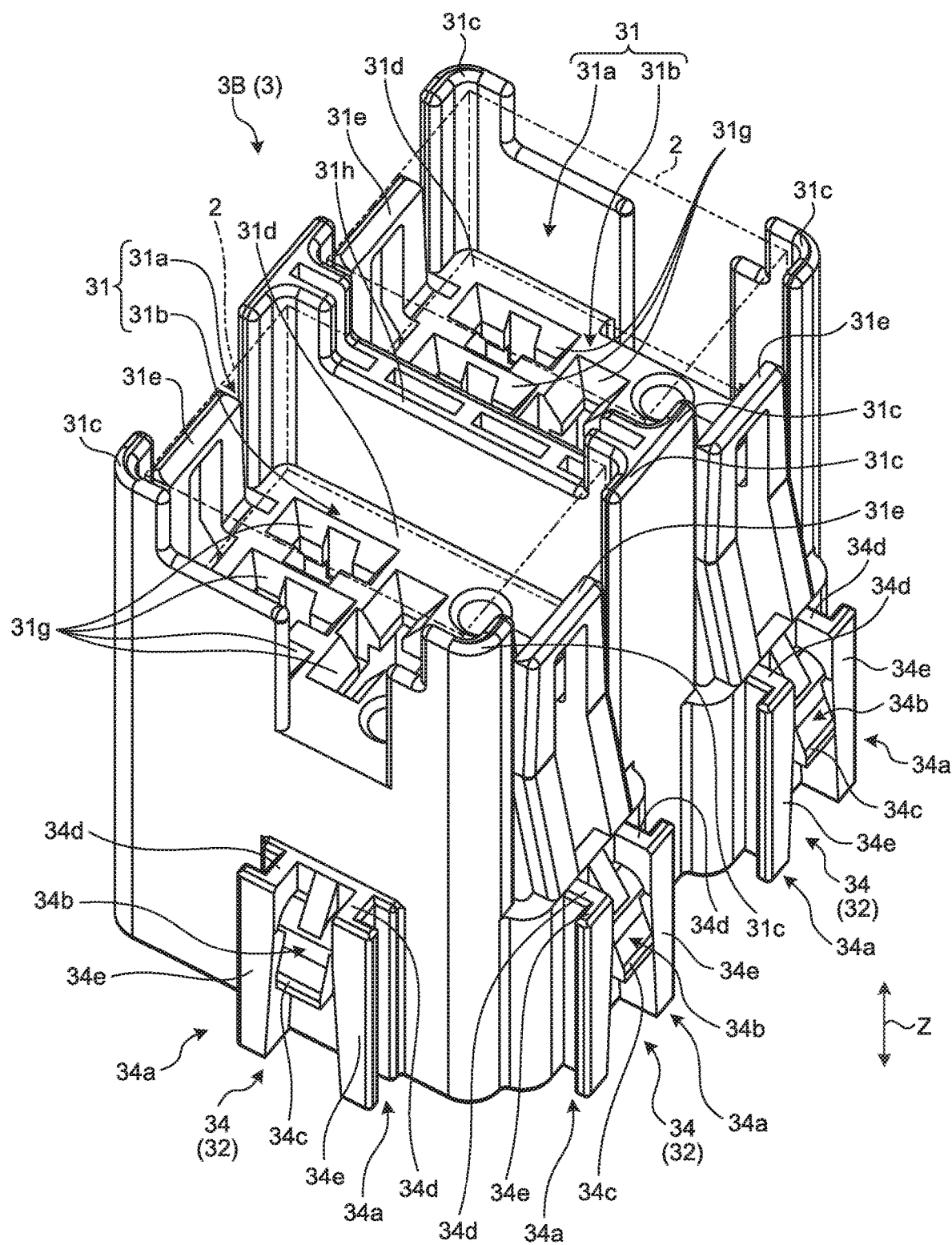
FIG. 5 is a perspective view illustrating a schematic configuration of a second block of the electrical connection box according to the embodiment.
Figure 6:
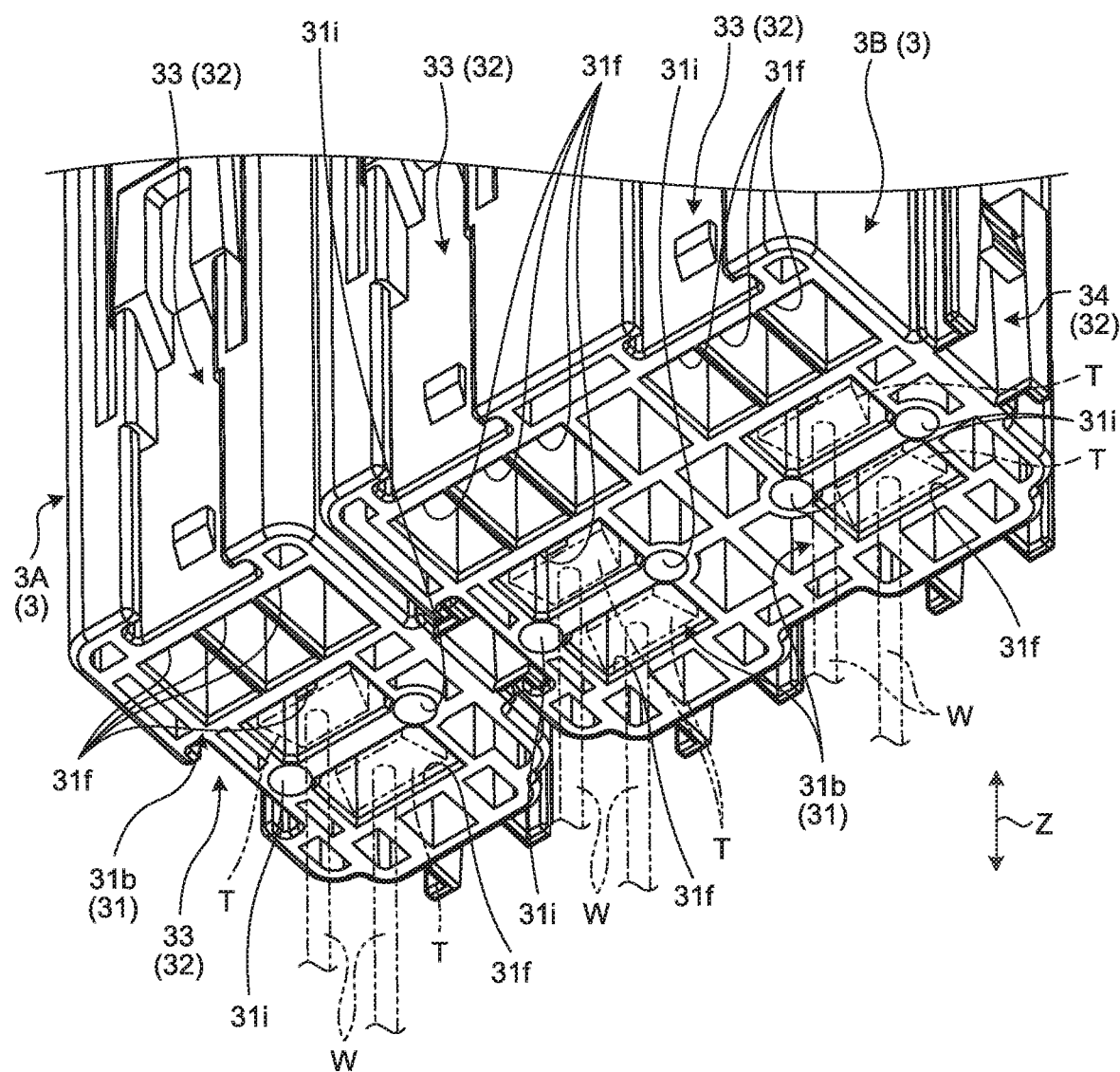
FIG. 6 is a partial perspective view illustrating a schematic configuration of a block of the electrical connection box according to the embodiment.

Specifically, as illustrated in FIGS. 4 to 6, the main body portion 31 includes a holding portion 31a and a connection portion 31b, and these portions integrally substantially form a rectangular parallelepiped. The holding portion 31a is a part by which the electronic component 2 is held. The holding portion 31a includes a plurality of partition walls 31c, a holding space 31d, and a pair of arm-like engagement portions 31e. The partition walls 31c are formed so as to project in the height direction Z from four corners of the connection portion 31b substantially forming a rectangular parallelepiped. Being a space partitioned by the partition walls 31c and substantially forming a rectangular parallelepiped, the holding space 31d is a space in which the electronic component 2 is housed. The pair of arm-like engagement portions 31e are parts that engage with and stop the electronic component 2. The pair of arm-like engagement portions 31e are formed so as to project in the height direction Z from two respective short edges of an upper surface of the connection portion 31b toward the same side as the partition walls 31c project. The pair of arm-like engagement portions 31e are positioned facing each other across the holding space 31d in a direction along the long edges of the connection portion 31b. The holding portion 31a houses the electronic component 2 inside the holding space 31d enclosed by the partition walls 31c, and holds the electronic component 2 inside the holding space 31d with the pair of arm-like engagement portions 31e engaging with and stopping the electronic component 2 as necessary. The connection portion 31b is a part that electrically connect between the electronic component 2 housed and held in the holding portion 31a and a terminal T provided on an end of the wiring member W. The connection portion 31b has a plurality of cavities 31f (see FIG. 6 in particular) formed in an end face facing away from the holding portion 31a in the height direction Z, and has a plurality of insertion holes 31g in an end face facing the holding portion 31a in the height direction Z (see FIGS. 4 and 5 in particular). The cavities 31f are spaces that house the terminals T, and two or more such cavities 31f are provided so as to correspond to the number of terminals to be attached. Each of the cavities 31f internally includes an engagement portion that engages with and stops the terminal T. The insertion holes 31g are communication holes that allow the holding space 31d of the holding portion 31a and each of the cavities 31f to communicate with each other, two or more insertion hole 31g are provided herein so as to correspond to the number of terminals (tabs) of the electronic components 2 to be attached. The connection portion 31b can electrically connect between the electronic component 2 and each of the terminals T of the wiring members W with the respective terminals T of the wiring members W inserted and fit into the cavities 31f and with the respective terminals of the electronic component 2 inserted and fit into the insertion holes 31g. This configuration enables the main body portion 31 to house and hold the electronic component 2 inside the holding portion 31a, and electrically connect between the electronic component 2 and the wiring member W via the connection portion 31b. As illustrated in FIG. 4, the first block 3A includes only one of the main body portions 31 thus configured. As illustrated in FIG. 5, the second block 3B is formed by having two of such main body portions 31 arranged side by side in a direction along the short edges of the main body portions 31 and joined together via a joining wall 31h and the like.

As illustrated in FIG. 6, the main body portion 31 of this embodiment has a plurality of (two herein) pilot holes 31i formed so as to penetrate the connection portion 31b in the height direction Z. Each of these pilot holes 31i is an insertion hole into which a guide pin is inserted when a checker pin is inserted into one of the cavities 31f for checking the engagement condition of the corresponding terminal T, the guide pin serving to position the checker pin and guide the insertion of the checker pin. In this case, the main body portion 31 has these pilot holes 31i formed in the neighborhoods of the cavities 31f inside the connection portion 31b. This configuration allows the main body portion 31 to have a smaller external form than, for example, in a case when these pilot holes 31i are provided to the outside of the connection portion 31b. The main body portion 31 of this embodiment has partition walls of these pilot holes 31i formed so as to project and intrude into the interiors of some of the cavities 31f. This configuration enables the main body portion 31 to, when insertion of one of the terminals T into any one of the cavities 31f into which the partition wall of the pilot hole 31i intrudes is attempted in a direction opposite to a proper direction, bring this terminal T into contact with this partition wall. Thus, the main body portion 31 can make it unlikely to have the terminal T inserted into the cavity 31f in the direction opposite to the proper direction and thereby can prevent improper attachment of the terminal T.

A plurality of block-side joints 32 are provided with respect to each of the main body portions 31 in each of the blocks 3 as illustrated in FIGS. 2 to 5. The block-side joints 32 of this embodiment include a first joint 33 and a second joint 34 that can engage with and stop against each other. Each of these blocks 3 includes a plurality of such first joints 33 and a plurality of such second joints 34. These first joints 33 and these second joints 34 are formed on the connection portion 31b of the corresponding main body portion 31 integrally with the connection portion 31b. These first joints 33 and these second joints 34 are provided on respective end faces of the connection portion 31b that are not provided with the cavities 31f and the insertion holes 31g, that is, end faces thereof opposing each other in the first width direction X and end faces thereof opposing each other in the second width direction Y.

Herein, the first block 3A includes two such first joints 33 and two such second joints 34. The first block 3A has: the respective two first joints 33 provided on one of the end faces of the connection portion 31b at the long-edge sides thereof and on one of the end faces thereof at the short-edge sides thereof; and the two respective second joints 34 provided on the other one of the end faces of the connection portion 31b at the long-edge sides thereof and on the other one of the end faces thereof at the short-edge sides thereof. That is, the first block 3A has one and the other of the two first joints 33 provided on respective adjacent end faces of the connection portion 31b, and has one and the other of the two second joints 34 provided on other adjacent respective end faces thereof. The second block 3B includes three such first joints 33 and three such second joints 34. The second block 3B has: the respective three first joints 33 provided on an end face of one of the two connection portions 31b at the long-edge sides thereof, and two end faces of the two respective connection portions 31b, the two end faces at the short-edge sides thereof; the respective three second joints 34 provided on an end face of the other of the two connection portions 31b at the long-edge sides thereof, and the other two end faces of the two respective connection portions 31b at the short-edge sides thereof. That is, the second block 3B has one of the first joints 33 and one of the second joints 34 provided on respective two end faces of a body integrally composed of the two connection portions 31b, the two end faces at the short-edge sides of the body. The second block 3B has two of the first joints 33 provided on an end face of the body integrally composed of the two connection portions 31b at the long-edge sides of the body, and has two of the second joints 34 provided on the other end face thereof at the long-edge sides thereof. Herein, each of the blocks 3 has the two or more first joints 33 and the two or more second joints 34 provided in a positional relation such that neither any two of these first joints 33 nor any two of these second joints 34 face each other in the first width direction X and the second width direction Y. That is, each of the blocks 3 has the first joints 33 and the second joints 34 provided in a positional relation such that each of the first joints 33 faces a corresponding one of the second joints 34 in the first width direction X or the second width direction Y. This configuration allows the blocks 3 to ensure a wide variety of combinations thereof when being joined together. In each of the blocks 3 of this embodiment, any one of the first joints 33 and the second joints 34 that is provided on the end face of each of the connection portions 31b at the long-edge sides of the connection portion 31b is positioned being offset towards one side from a center position C1 (see FIG. 3 in particular) in a direction along the long edges of the main body portion 31, that is, towards the end face of the connection portion 31b that has one of the second joints 34 thereon.

The two or more first joints 33 provided in each of the blocks 3 have substantially the same configurations, and the following description therefore applies to all of these first joints 33 unless otherwise stated. Likewise, the two or more second joints 34 provided in each of the blocks 3 have substantially the same configurations, and the following description therefore applies to all of these second joints 34 unless otherwise stated.

Figure 7:
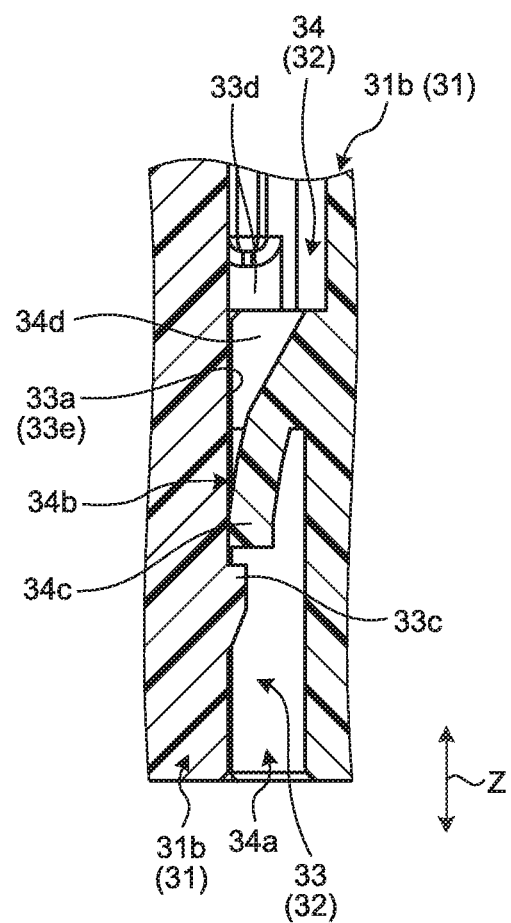
FIG. 7 is a partial sectional perspective view illustrating a schematic configuration of a block-side joint of the electrical connection box according to the embodiment.
Figure 8:
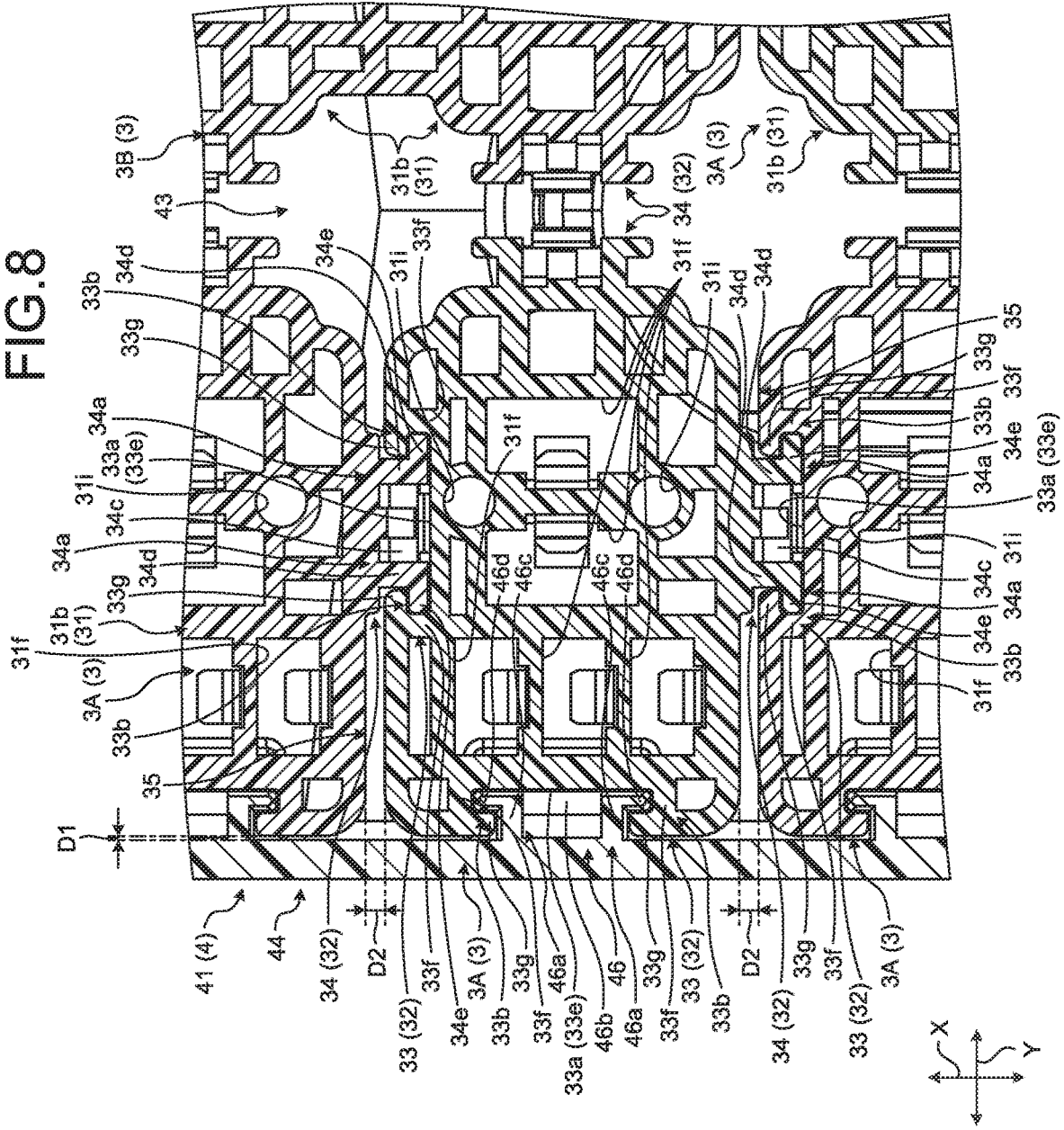
FIG. 8 is a partial sectional perspective view illustrating schematic configurations of the block side joint and a wall-body side joint of the electrical connection box according to the embodiment.

Specifically, each of the first joints 33 is formed as a part the entirety of which is recessed towards the connection portion 31b of the corresponding main body portion 31 as illustrated in FIGS. 4, 7, and 8. The first joint 33 includes a recessed portion 33a, rails 33b, an engagement projection 33c, and a restrictive contact portion 33d. The recessed portion 33a is formed as a recessed part on an end face of the connection portion 31b of the main body portion 31 in the first width direction X or the second width direction Y. The recessed portion 33a extends penetrating the connection portion 31b in the height direction Z. A part of the recessed portion 33a constitutes a notch 33e to be described later. The rails 33b are provided in a pair facing each other across the recessed portion 33a in the first width direction X or the second width direction Y. Each of the rails 33b is formed on the end face of the connection portion 31b linearly in the height direction Z. The pair of rails 33b extend in the height direction Z from an edge of the connection portion 31b, the edge belonging to an end face thereof facing away from the holding portion 31a. Each of the rails 33b includes a base end 33f and a front end 33g. A section perpendicular to the height direction Z of the rail 33b has a shape formed by the base end 33f and the front end 33g and is substantially L-shaped (see FIG. 8). The base end 33f is formed, in a plate-like shape, projecting from an end face of the connection portion 31b substantially perpendicularly to the end face. The front end 33g is formed as a part bent from the base end 33f in a direction substantially perpendicular thereto. The front ends 33g of the pair of rails 33b are bent in opposite directions. Herein, the front ends 33g of the pair of rails 33b are bent in directions that draw the front ends 33g nearer to each other. The engagement projection 33c is a part that engages with and stops against the second joint 34 or a wall-body side joint 46 to be described later. The engagement projection 33c is formed in the recessed portion 33a and substantially at the midpoint between the pair of rails 33b. The engagement projection 33c is formed in a click-like shape projecting from the end face of the connection portion 31b in the recessed portion 33a. The upper face of the engagement projection 33c in the height direction Z functions as a face that engages with and stops against the second joint 34 or a wall-body side joint 46 to be described later. The restrictive contact portions 33d are provided to the respective rails 33b and are parts that restrict relative movement in the height direction Z by making contact with the rails 34a of the second joint 34 or rails 46a of the wall-body side joint 46. Each of the restrictive contact portions 33d is provided at a position of the corresponding rail 33b above the engagement projection 33c in the height direction Z, the position herein being in one side of the rail 33b that faces the holding portion 31a. The restrictive contact portion 33d herein is formed substantially at the midpoint between the engagement projection 33c and an end face of the connection portion 31b in the height direction Z, the end face facing the holding portion 31a.

The main body portion 31 of this embodiment has a notch 33e in a part corresponding to the first joint 33 described above. The notch 33e is formed penetrating the connection portion 31b of the main body portion 31 in the height direction Z from the engagement projection 33c toward the electronic component 2. The notch 33e of this embodiment is formed of a part of the recessed portion 33a, the part herein being a portion spanning in the height direction Z from the engagement projection 33c to an end face of the connection portion 31b that faces the holding portion 31a.

Each of the second joints 34 as a whole is formed as a part raised from the connection portion 31b of the corresponding main body portion 31 as illustrated in FIGS. 5, 7, and 8. The second joint 34 includes rails 34a, an arm 34b, and an engagement projection 34c. The rails 34a are provided, on an end surface of the connection portion 31b of the main body portion 31, in a pair spaced apart from and opposed to each other in the first width direction X or the second width direction Y, the end face being parallel to the first width direction X or the second width direction Y. Each of the rails 34a is formed on an end face of the connection portion 31b linearly in the height direction Z. The pair of rails 34a is formed substantially parallel to each other, extending in the height direction Z from an end of the connection portion 31b, the end belonging to an end face thereof facing away from the holding portion 31a. The pair of rails 34a are formed on the connection portion 31b so as to extend up to a position being substantially at the center thereof in the height direction Z. Each of the rails 34a includes a base end 34d and a front end 34e. A section of the rail 34a perpendicular to the height direction Z has a shape formed by the base end 34d and the front end 34e, which is substantially L-shaped (see FIG. 8). The base end 34d is formed, in a plate-like shape, projecting substantially perpendicularly from an end face of the connection portion 31b. The front end 34e is formed as a part bent from the base end 34d in a direction substantially perpendicular thereto. The front ends 34e of the pair of rails 34a are bent in opposite directions. Herein, the front ends 34e of the pair of rails 34a are bent in directions that draw the front ends 34e away from each other. The arm 34b is formed, in an arm-like shape, projecting from the end face of the connection portion 31b and extending in the height direction Z. The arm 34b is formed in a rod-like shape. The arm 34b has its base end supported by the end face of the connection portion 31b in a cantilever fashion, and extends downward in the height direction Z, that is, toward one side of the connection portion 31b that does not face the holding portion 31a. The arm 34b has its front end formed as a free end. The arm 34b has its base end supported in a cantilever fashion and has its front end formed as a free end, thereby being formed with relatively high flexibility being elastically deformable in a direction (the first width direction X or the second width direction Y) that intersects the height direction Z. That is, the arm 34b is flexible only in that intersecting direction. The arm 34b is formed in a position that is substantially at the center between the pair of rails 34a and that makes the base end aligned with respective upper edges of the rails 34a in the height direction Z. The engagement projection 34c is formed on the front end of the arm 34b. The engagement projection 34c is a part that engages with and stops against the engagement projection 33c of the first joint 33. The engagement projection 34c is formed in a click-like shape projecting from the front end of the arm 34b. The lower face of the engagement projection 34c in the height direction Z functions as a face that engages with and stops against the engagement projection 33c of the first joint 33.

Two or more of the blocks 3 thus configured are joined together by the block-side joints 32 as illustrated in FIGS. 7 and 8. Specifically, two or more of the blocks 3 are joined together with the first joint 33 and the second joint 34, which are included among the block-side joints 32, engaging with and stopping against each other. That is, each two adjacent ones of the blocks 3 are joined together with one of the first joints 33 of one of these two blocks and one of the second joints 34 of the other thereof engaging with and stopping against each other. In this case, these adjacent blocks 3 are attached to each other in a manner such that, after being set in a positional relation that allows each of the rails 33b of the first joint 33 to engage with the corresponding rail 34a of the second joint 34 from above in the height direction Z, the first joint 33 and the second joint 34 are moved relatively to each other in the height direction Z. Herein, these adjacent blocks 3 are attached to each other in a manner such that the rails 34a of the second joint 34 are inserted from below into a space between the rails 33b of the first joint 33. These adjacent blocks 3 then engage with each other with the pair of rails 33b positioned on the outsides of the pair of the rails 34a while wrapping around the respective rails 34a and with each of the front ends 33g and the corresponding front end 34e meshing with each other. These adjacent blocks 3 are relatively movable in a manner such that each of the rails 33b and the corresponding rail 34a are guided by each other in the height direction Z with the front end 33g of the rail 33b and the front end 34e of the rail 34a meshing with each other. In these adjacent blocks 3, the engagement projection 33c of the first joint 33 and the engagement projection 34c of the second joint 34 engage with and stop against each other when the engagement projection 33c reaches beyond the engagement projection 34c by being pushed in toward the engagement projection 34c to warp and press down the arm 34b of the second joint 34. In this state, relative movement of these adjacent blocks 3 is restricted in the height direction Z because respective upper edges of the rails 34a of the second joint 34 in the height direction Z make contact with the restrictive contact portions 33d of the first joint 33. Consequently, these adjacent blocks 3 are joined together via the first joint 33 and the second joint 34. Additionally, these adjacent blocks 3 are consequently set in a state arranged side by side with a gap 35 present between the respective main body portions 31 while being joined together via the first joint 33 and the second joint 34 (see FIG. 8 in particular). That is, the block-side joints 32 of this embodiment are configured as parts capable of joining together these adjacent blocks 3 via the first joint 33 and the second joint 34 while keeping these blocks 3 arranged side by side with the gap 35 present between the respective main body portions 31 in the first width direction X.

The casing 4 houses the electronic components 2 in a housing space 43 formed in the interior thereof, as illustrated in FIGS. 1 to 3. The casing 4 is composed of a lower cover 41 as a casing main body and an upper cover 42 as a lid member. The casing 4 as a whole is formed substantially in a rectangular-parallelepiped box shape with the lower cover 41 and the upper cover 42 set in place together. The casing 4 of this embodiment, as a whole, is formed substantially in a rectangular-parallelepiped box shape that has the long edges extending in the first width direction X and the short edges extending in the second width direction Y. The casing 4 has a two-layered separable structure having the lower cover 41 and the upper cover 42 separated from each other. The casing 4 has the lower cover 41 and the upper cover 42 attached on each other by being stacked in a certain stacking direction, which herein is the height direction Z, and thus defines the housing space 43, which internally houses a plurality of electronic components 2. The lower cover 41 and the upper cover 42 are formed of insulative synthetic resin. The lower cover 41 is a member that mainly forms the housing space 43 on which the electronic components 2 are attached. The lower cover 41 is a tray-shaped member having an opening on the vertically upward side thereof. The lower cover 41 is formed of a side wall 44 and a bottom 45 into a hollow shape, the side wall 44 being a wall body formed substantially in a shape of a rectangular cylinder, the bottom 45 being a bottom body that blocks off one opening (an opening on the lower side in the height direction Z) of the side wall 44. The upper cover 42 is a lid-shaped member that blocks off the opening of the lower cover 41 on the vertically upward side thereof. The casing 4 has the upper cover 42 attached on the upper face of the lower cover 41 in the height direction Z with the opening of the lower cover 41 and the upper cover 42 facing each other. In the casing 4, the lower cover 41 and the upper cover 42 engage with and stop against each other via an engagement mechanism of any one of various forms. Consequently, the casing 4 internally has the housing space 43 formed by the lower cover 41 and the upper cover 42. The housing space 43 is a space defined by the lower cover 41 and the upper cover 42 and enclosed by the lower cover 41 and the upper cover 42. That is, the housing space 43 is defined by the side wall 44 of the lower cover 41 in the first width direction X and the second width direction Y, the lower side thereof in the height direction Z is defined by the bottom 45 of the lower cover 41, and the upper side thereof in the height direction Z is defined by the upper cover 42. The casing 4 also includes an insertion opening, through which the wiring member W is inserted spanning the inside and the outside of the housing space 43 of the casing 4 and is electrically connected to the electronic components 2. The electrical connection box 1 includes a plurality of blocks 3 provided in this housing space 43.

As illustrated in FIGS. 3 and 8 to 11, the side wall 44 of this embodiment includes a plurality of wall-body side joints 46 and constitutes a supporting wall body by which a plurality of blocks 3 are supported via these wall-body side joints 46 in the second width direction Y in a cantilever fashion.

Specifically, as illustrated in FIGS. 8 to 10, the wall-body side joints 46 are formed integrally with the side wall 44 on the inner wall face of the side wall 44, that is, a face thereof that faces the housing space 43. Some and the others of the wall-body side joints 46 are provided on respective opposite sides of the inner wall face along the long edges of the side wall 44, that is, respective opposite sides of the inner wall face that run in the first width direction X. Five wall-body side joints 46 are provided at uniform intervals in the first width direction X on each of the opposite sides of the inner wall, and a total of 10 wall-body side joints 46 are provided. Each of the wall-body side joints 46 is a part for supporting and fixing one of the main body portions 31 in the blocks 3 in the second width direction Y in a cantilever fashion. That is, the wall-body side joints 46 support and fix, in a cantilever fashion in the second width direction Y, the two or more blocks 3 joined together via the block-side joints 32. The configurations of these wall-body side joints 46 are almost identical, and a common description is given for the wall-body side joints 46 unless otherwise stated.

The wall-body side joint 46 as a whole is formed as a part raised from the inner wall face of the side wall 44. The wall-body side joint 46 of this embodiment is configured so as to be capable of engaging with and stopping against the first joint 33 included among the block-side joints 32. The side wall 44 herein has a columnar projection 44a on one side of the inner wall face thereof, the one side adjoining the bottom 45. The columnar projection 44a is formed so as to project from the inner wall face of the side wall 44 toward the housing space 43. The columnar projection 44a is formed in a manner such that the outer wall face of the side wall 44 is dented toward the housing space 43. The columnar projection 44a is formed so as to extend in a columnar shape in the height direction Z. A plurality of such columnar projections 44a are provided in accordance with the number of wall-body side joints 46, and a total of ten columnar projections 44a are provided herein. The wall-body side joints 46 are provided to the upper side of the respective columnar projections 44a in the height direction Z.

The wall-body side joint 46 includes rails 46a and an engagement projection 46b The rails 46a are provided, on the inner wall face of the side wall 44, in a pair spaced apart from and opposed to each other in the first width direction X. Each of the rails 46a is formed on the inner wall face of the side wall 44 linearly in the height direction Z. The pair of rails 46a are formed substantially parallel to each other, extending upward in the height direction Z from the upper end of the columnar projection 44a in the height direction Z. The pair of rails 46a are formed extending in a manner such that respective upper ends thereof in the height direction Z are each positioned a space away from the upper end of the side wall 44 in the height direction Z. Each of the rails 46a includes a base end 46c and a front end 46d. A section of the rail 46a perpendicular to the height direction Z has a shape formed by the base end 46c and the front end 46d, which is substantially L-shaped (see FIG. 8). The base end 46c is formed, in a plate-like shape, projecting substantially perpendicularly from the inner wall face of the side wall 44. The front end 46d is formed as a part bent from the base end 46c in a direction substantially perpendicular thereto. The front ends 46d of the pair of rails 46a are bent in opposite directions. Herein, the front ends 46d of the pair of rails 46a are bent in directions that draw the front ends 46d away from each other. The engagement projection 46b is a part that engages with and stops against the engagement projection 33c of the first joint 33. The engagement projection 46b is formed in a click-like shape projecting from the inner wall face of the side wall 44. The engagement projection 46b is formed in a beam shape so as to connect between the pair of rails 46a in the first width direction X. The lower face of the engagement projection 46b in the height direction Z functions as a face that engages with and stops against the engagement projection 33c of the first joint 33.

Figure 11:
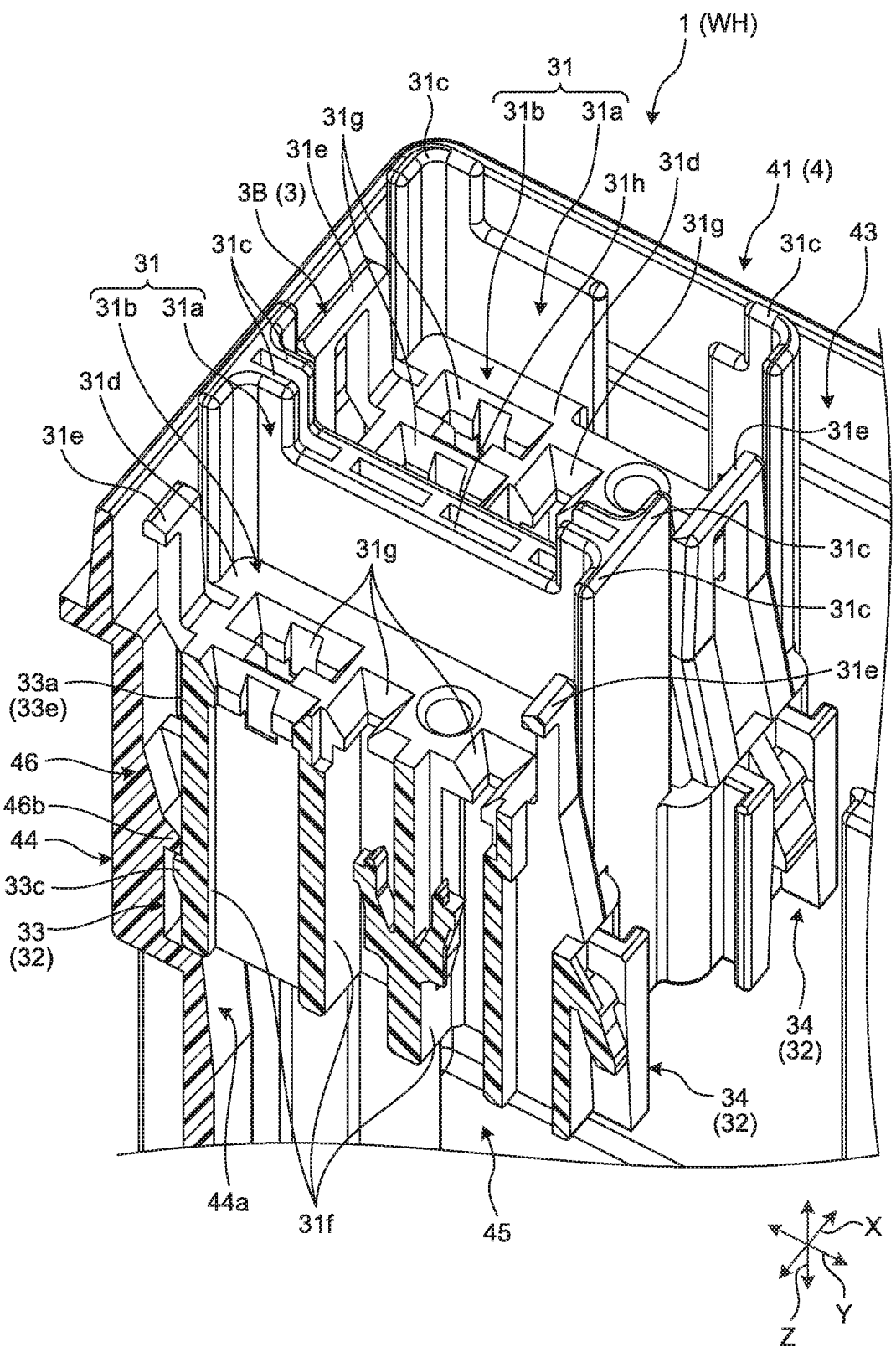
FIG. 11 is a partial sectional perspective view illustrating a schematic configuration of a wall-body side joint of the electrical connection box according to the embodiment.

The side wall 44 thus configured is joined to the two or more blocks 3 via the wall-body side joints 46 as illustrated in FIGS. 8 and 11. More specifically, the side wall 44 is joined to the blocks 3 with each of the wall-body side joints 46 and the corresponding first joint 33, which is included among the block-side joints 32, engaging with and stopping against each other. In this case, the respective blocks 3 are attached in a manner such that, after being set in a positional relation that allows each of the rails 33b of the first joint 33 to engage with the corresponding rail 46a of the wall-body side joint 46 from above in the height direction Z, the wall-body side joint 46 and the first joint 33 are moved relatively to each other in the height direction Z. Herein, these blocks 3 are attached to the side wall 44 in a manner such that the rails 46a of the wall-body side joint 46 are inserted from below into the interval between the rails 33b of the first joint 33. In these blocks 3, the pair of rails 33b is positioned on the outsides of the pair of the rails 46a in a manner wrapping around the respective rails 46a, and each of the front ends 33g meshes with the corresponding front end 46d. The blocks 3 are movable relatively to the side wall 44 in a manner such that each of the rails 33b and the corresponding rail 46a are guided by each other in the height direction Z with the front end 33g of the rail 33b and the front end 46d of the rail 46a meshing with each other. In these blocks 3, the engagement projection 33c of the first joint 33 and the engagement projection 46b of the wall-body side joint 46 engage with and stop against each other when the engagement projection 33c reaches beyond the engagement projection 46b by being pushed in toward the engagement projection 46b. In this state, movement of the blocks 3 relative to the side wall 44 is restricted because, while respective upper edges of the rails 46a of the wall-body side joint 46 in the height direction Z make contact with the restrictive contact portions 33d of the first joint 33, the main body portion 31 is mounted on the upper end of the columnar projection 44a in the height direction Z. Consequently, the blocks 3 are joined to the side wall 44 via the first joint 33 and the wall-body side joint 46. In this state, the wall-body side joints 46 support and fix the two or more blocks 3 in a cantilever fashion in the second width direction Y.

In this case, the block 3 and the side wall 44 are joined together via the wall-body side joint 46 with a distance D1 (see FIG. 8) between the main body portion 31 and the side wall 44 in the second width direction Y, the distance D1 being smaller than a distance D2 (see FIG. 8) between each two of the main body portions 31 that are joined together via the block-side joints 32 in the first width direction X. In this case, the distance D1 is preferably set to the smallest distance achievable in a manufacturing process, and is more preferably set to a distance that brings the main body portion 31 and the side wall 44 into contact with each other, that is, D1=0. This configuration enables the side wall 44 to more rigidly support and fix to itself, via the wall-body side joint 46, an end of each of the blocks 3 that faces the side wall 44.

In the electrical connection box 1 configured as described above, for example, the respective terminals T of the wiring members W are inserted and fitted into the corresponding cavities 31f of the blocks 3 in the first place, so that the wiring members W are attached to the blocks 3. Thereafter, for the electrical connection box 1, the respective blocks 3 are attached to each other via the first joints 33 and the second joints 34 that are included among the block-side joints 32. The blocks 3 of this embodiment form two groups, for example, as illustrated in FIG. 3. One of these groups each consisting of two or more blocks 3 includes one first block 3A and two second blocks 3B joined together side by side in the first width direction X. The other one of these groups each consisting of two or more blocks 3 includes three first blocks 3A and one second block 3B joined together side by side in the first width direction X. Herein, in each of these groups each consisting of two or more blocks 3, each of the first joints 33 and the corresponding second joint 34 engage with and stop against each other that are each located in one side of the corresponding main body portion 31 at the long-edge sides of the main body portion 31. That is, in each of these groups each consisting of two or more blocks 3, these blocks 3 have the first joints 33 on one side of the group in the second width direction Y placed side by side in the first width direction X, and have the second joints 34 on the other side thereof in the second width direction Y placed side by side in the first width direction X. In this case, in each of these groups each consisting of two or more blocks 3, the main body portions 31 of each adjacent ones of these blocks 3 are joined together via the block-side joints 32, so that these main body portions 31 are joined together side by side with the gap 35 therebetween via the block-side joints 32 in the first width direction X. At this stage, in these groups each consisting of two or more blocks 3, the respective engagement statuses of the engagement projections 33c can be observed visually or in another manner in directions from the corresponding holding portions 31a through the notches 33e (recessed portions 33a) formed in the corresponding main body portions 31.

Subsequently, for the electrical connection box 1, each of the groups each consisting of two or more blocks 3 joined together via the block-side joints 32 with the gaps 35 between adjacent ones of the blocks 3 in the first width direction X is housed in the housing space 43 of the casing 4 from above in the height direction Z with the wiring members W inserted through the insertion openings and the like and is attached to the corresponding wall-body side joints 46 on the side wall 44. In this case, in each of these groups each consisting of two or more blocks 3, on one side of the group in the second width direction Y, the first joints 33 of the blocks 3 placed side by side in the first width direction X engage with and stop against the corresponding wall-body side joints 46 on the side wall 44. Consequently, in the electrical connection box 1, each of these groups each consisting of two or more blocks 3 can be supported and fixed via these wall-body side joints 46 in the second width direction Y in a cantilever fashion in that direction, the two or more blocks 3 being joined together via the block-side joints 32 in the first width direction X with the gaps 35 between adjacent ones thereof. In this state, in the electrical connection box 1, each of these groups each consisting of two or more blocks 3 is supported by and fixed to the side wall 44 via the first joints 33 on one side of the group, the one side facing the wall-body side joints 46. In contrast, the other block-side joints 32 of these blocks 3 are not supported by the side wall 44 and are left free. Additionally, one and the other of these groups each consisting of two or more blocks 3 are left unjoined from each other. That is, in the electrical connection box 1, each of these groups each consisting of two or more blocks 3 is supported and left tightly fixed on one side of the group, the one side facing the wall-body side joints 46. As described above, in the blocks 3, each of the first joints 33 and the second joints 34 that are provided along the long edges of the connection portions 31b are each positioned being offset towards one of the short edges of the corresponding main body portion 31 from the center position C1 thereof in a direction along the long edges thereof, the one of the short edges being located on one side having the second joint 34. Consequently, in the electrical connection box 1, the block-side joints 32 that are being used to join together these blocks 3 are positioned offset towards one side from the center position C1 while the two or more blocks 3 are fixed to the side wall 44 via the wall-body side joints 46, the one side facing away from the side wall 44.

Thereafter, in the electrical connection box 1, the electronic components 2 are attached to the respective holding portions 31a of the main body portions 31 of the blocks 3 to be electrically connected to the wiring members W, and the upper cover 42 is then attached on the lower cover 41. The electrical connection box 1 has a configuration such that, when any one of the electronic components 2 held on the holding portion 31a of the main body portion 31 needs to be detached therefrom, the electronic component 2 can be easily caught by a jig, such as a puller, inserted into spaces formed between the partition walls 31c, for example. In the electrical connection box 1, this configuration enables the electronic component 2 to be easily detached from the block 3 and, for example, allows for enhanced workability in replacing the electronic components 2.

The electrical connection box 1 described above has a plurality of blocks 3 joined together side by side via the block-side joints 32 in the first width direction X, and so does the wire harness WH described above. In this case, these blocks 3 are joined together with the main body portions 31 thereof placed side by side in the first width direction X with the gaps 35 between adjacent ones thereof in the first direction. In the electrical connection box 1, the side wall 44 supports and fixes two or more blocks 3 via the wall-body side joints 46 in a cantilever fashion in the second width direction Y, the two or more blocks being joined together side by side in the first direction X. This configuration enables the electrical connection box 1 to be effective in properly installing the electronic components 2 because, while the gaps 35 are formed between adjacent ones of the main body portions 31 of the blocks 3 joined together, these joined blocks 3 are supported by the side wall 44 in a cantilever fashion. That is, the electrical connection box 1 is capable of absorbing the tolerances of the individual members through a clearance structure using the gaps 35 between adjacent ones of the main body portions 31. The electrical connection box 1 is also capable of absorbing, through a cantilever structure for supporting two or more blocks 3. In this case, the electrical connection box 1 has the two or more blocks 3 joined together in the first width direction X while being supported by the side wall 44 in a cantilevered fashion, and therefore can secure adequate rigidity of a group formed by these joined blocks 3 as a whole. Having these structures, the electrical connection box 1 is further capable of preventing the main body portions 31 to collide with each other through the clearance structure using the gaps 35 between the adjacent main body portions 31 when vibration of the vehicle is being absorbed through the structure having two or more blocks 3 supported in a cantilever fashion. That is, the electrical connection box 1 is capable of preventing thermal interference of the main body portions 31 with each other through the clearance structure using the gaps 35 between the adjacent main body portions 31. Consequently, the electrical connection box 1 enables appropriate installation of the electronic components 2, and so does the wire harness WH.

The electrical connection box 1 described above has two or more blocks 3 joined to the side wall 44 via the wall-body side joints 46 with the distance D1 between each of the corresponding main body portions 31 and the side wall 44 smaller than the distance D2 between the adjacent main body portions 31, and so does the wire harness WH described above. The electrical connection box 1 enables, through this configuration, the side wall 44 to more rigidly support and fix these blocks 3 via the wall-body side joint 46, and is therefore capable of more suitably providing the cantilever structure for the supporting than otherwise. Consequently, the electrical connection box 1 enables appropriate installation of the electronic components 2.

Furthermore, the electrical connection box 1 described above has the block-side joints 32, in a state in which these blocks 3 are joined together via these joints, positioned offset towards one side from the center position C1 of the main body portion 31 in the second width direction Y, the one side facing away from the side wall 44. The electrical connection box 1 enables, through this configuration, joining positions of these blocks 3 to be located in one side of these blocks 3 that is relatively distant from the ends thereof supported in a cantilever fashion, and therefore being improved in capability of absorbing vibration and the like when the vehicle vibrates.

Furthermore, the electrical connection box 1 described above enables, when two or more blocks 3 are joined together via the first joints 33 and the second joints 34, the respective engagement statuses of the engagement projections 33c to be observed visually or in another manner in directions from the corresponding holding portions 31a through the notches 33e (recessed portions 33a) formed in the corresponding main body portions 31, and so does the wire harness WH described above. Furthermore, the electrical connection box 1 described above enables, when two or more blocks 3 are joined to the side wall 44 via the first joints 33 and the wall-body side joints 46, the respective engagement statuses of the engagement projections 33c to be observed visually or in another manner in directions from the corresponding holding portions 31a through the notches 33e (recessed portions 33a) formed in the corresponding main body portions 31. The electrical connection box 1 enables, through this configuration, work to be performed while the engagement statuses of the engagement projections 33c are observed visually when the first joint 33 and the second joint 34, or the first joint 33 and the wall-body side joint 46, are caused to engage with and stop each other, thereby allowing for enhanced workability and reduction in manufacturing cost. The electrical connection box 1 enables the respective engagement statuses of the engagement projections 33c to be observed visually, thereby enabling members to more reliably engage with and be joined to each other than otherwise.

The electronic component unit and the wire harness according to the embodiment of the present invention can be variously modified within the scope defined by the claims.

Figure 12:
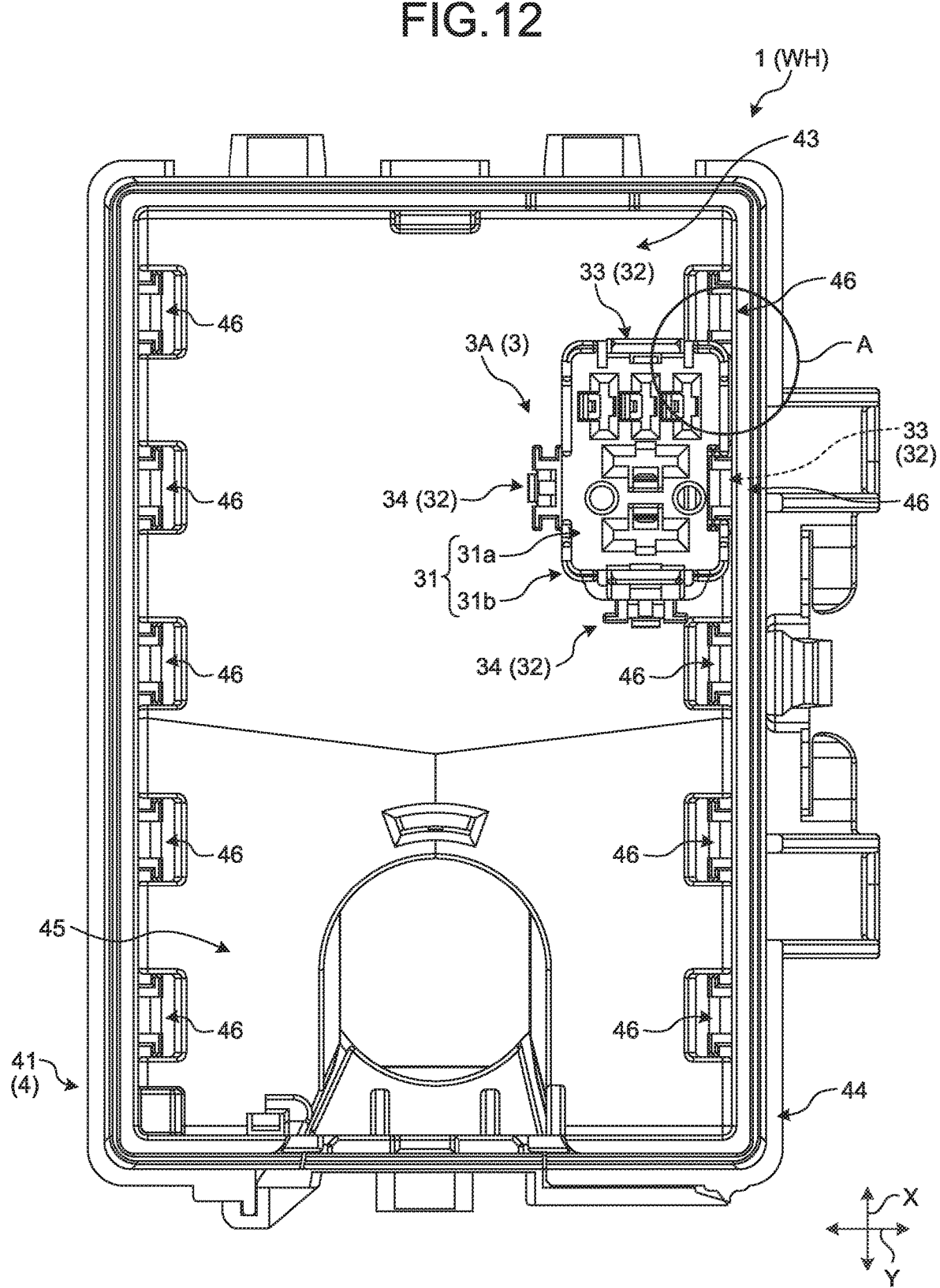
FIG. 12 is a plan view explaining prevention of erroneous assembly in the electrical connection box according to the embodiment.

While the electrical connection box 1 has been described above as being assembled in a manner such that two or more blocks 3 are joined together and then attached to the side wall 44 of the casing 4, this example is not limiting. For example, the blocks 3 may be joined together while being attached to the side wall 44 one by one. In this case, the electrical connection box 1 can prevent these blocks 3 from being improperly attached because, in the main body portions 31 thereof, the first joints 33 that are provided along the long sides of the connection portions 31b are positioned offset from the center position C1. That is, when each of the blocks 3 is arranged in a proper positional relation such that the first joint 33 provided along a short-edge side of the connection portion 31b thereof engages with and is stopped by the wall-body side joints 46, the block 3 can be properly attached with no interference between the other part of the main body portion 31 and a part adjacent thereto such as the wall-body side joint 46. In contrast, as illustrated in FIG. 12, when it is attempted to arrange each of the blocks 3 in an improper positional relation such that the first joint 33 provided along a long-edge side of the connection portion 31b thereof engages with and is stopped by the wall-body side joints 46, the block 3 cannot be properly attached because the other part of the main body portion 31 interferes with a part adjacent thereto such as the wall-body side joints 46 as indicated by the part of the enclosing line A in FIG. 12. Consequently, the electrical connection box 1 can prevent the blocks 3 from being improperly attached in an improper positional relation with the side wall 44.

While the supporting wall body that supports two or more blocks 3 has been described above as being the side wall 44 of the lower cover 41 of the casing 4, this example is not limiting. The supporting wall body may be an independent wall body that is not included in the casing 4 or may be a structure included in a body of the vehicle, for example. In this case, the electronic component unit need not be implemented as what is called an electrical connection box.

The side wall 44 has been described above as a component that supports and fixes a line of blocks 3 on respective opposite sides of the inner wall face of the side wall 44 in a cantilever fashion via two or more wall-body side joints 46 in the second width direction Y, the line being formed by either of the two groups each consisting of two or more blocks 3. This example, however, is not limiting. The side wall 44 may be configured to at least support and fix the groups each consisting of two or more blocks 3 via the wall-body side joints 46 in a cantilever fashion in the second width direction Y, the two or more blocks 3 being joined together via the block-side joints 32 with the gaps 35 between adjacent ones thereof in the first width direction X. For example, the side wall 44 may be configured to support and fix two lines of blocks 3 in a cantilever fashion, via two or more wall-body side joints 46, the two lines each consisting of two or more blocks 3 joined together via the block-side joints 32 with the gaps 35 between adjacent ones thereof in the first width direction X, the two lines being joined together with the gap 35 therebetween in the second width direction Y.

While the blocks 3 have been described as including at least one first block 3A and at least one second block 3B that differ from each other in number of attachable electronic components 2, this example is not limiting. The blocks 3 may be of a single kind or may be of multiple kinds.

The block-side joints 32 have been described above as including the first joints 33 and the second joints 34, and each of the blocks 3 has been described above as including two or more first joints 33 and two or more second joints 34. This example, however, is not limiting. Furthermore, while the wall-body side joints 46 have been described as each being capable of engaging with and stopping the first joint 33, this example is not limiting. The wall-body side joints 46 may be configured to at least cause the side wall 44 to support and fix two or more blocks 3 via the wall-body side joints 46 in a cantilever fashion in the second width direction Y, the two or more blocks 3 being joined together via the block-side joints 32.

The blocks 3 have been described as having the first joints 33 and the second joints 34 that are provided on certain long-edge sides of the connection portions 31b thereof each positioned offset towards one side from the center position C1 in a direction along the long edges of the corresponding main body portion 31. This example, however, is not limiting.

While the electrical connection box 1 described above has been illustrated as being applied to the wire harness WH for a vehicle, this example is not limiting.

While the casing 4 has been described as having a two-layered separable structure having the lower cover 41 and the upper cover 42 separated from each other, this example is not limiting. The casing 4 may be separated into three parts.

The electronic component unit according to the present embodiment has a plurality of blocks joined together side by side via block-side joints in a first direction, and so does the wire harness according to the present embodiment. In this case, these blocks are joined together with respective main bodies thereof placed side by side with gaps between adjacent ones thereof from each other in the first direction. The electronic component unit has two or more blocks supported and fixed by a supporting wall body in a cantilever fashion via respective wall-body side joints thereof in a second direction, and so does the wire harness, the two or more blocks being joined together side by side in the first direction. This configuration enables the electronic component unit and the wire harness to be effective in properly installing electronic components because, while gaps are formed between adjacent ones of the main body portions of the blocks joined together, the thus joined blocks are supported by the supporting wall body in a cantilever fashion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic component unit comprising:
a plurality of blocks each including at least one main body portion to each of which an electronic component is attached, and a block-side joint that joins any two of the blocks to each other, the blocks being joined together via the block-side joint with the main body portions arranged side by side in a first direction with gaps between adjacent ones of the main body portions; and
a supporting wall body including a plurality of wall-body side joints that support and fix in a second direction intersecting the first direction, in a cantilever fashion, the blocks joined together via the block-side joint, wherein
the block-side joint includes a first joint and a second joint, the first joint being capable of engaging with and stopping against the second joint and being formed in a different shape against the second joint,
the first joint is formed in a recessed shape at the main body, and
the second joint is formed in a raised shape at the main body.

2. The electronic component unit according to claim 1, wherein
the second direction is orthogonal to a height direction of the supporting wall body, and is a direction from the supporting wall body to at least one of the blocks, and
the wall-body side joints join the blocks to the supporting wall body with a distance between each of the main body portions and the supporting wall body in the second direction being smaller than a distance in the first direction between the main body portions that are joined together via the block-side joints.

3. The electronic component unit according to claim 2, wherein
the block-side joint, while the blocks are in a state fixed to the supporting wall body via the wall-body side joints, is positioned offset towards one side from a center position of the corresponding main body portion in the second direction, the one side facing away from the supporting wall body.

4. The electronic component unit according to claim 3, wherein the blocks include two or more of the first joints and two or more of the second joints, each of the wall-body side joints is capable of engaging with and stopping any one of the first joints, each of the first joints includes an engagement projection that engages with and stops against any one of the second joints or any one of the wall-body side joints, and each of the main body portions includes a notch that penetrates through each of the main body portions in a third direction from the corresponding engagement projection towards the electronic component, the third direction intersecting the first direction and the second direction.

5. The electronic component unit according to claim 2, wherein the blocks include two or more of the first joints and two or more of the second joints, each of the wall-body side joints is capable of engaging with and stopping any one of the first joints, each of the first joints includes an engagement projection that engages with and stops against any one of the second joints or any one of the wall-body side joints, and each of the main body portions includes a notch that penetrates through each of the main body portions in a third direction from the corresponding engagement projection towards the electronic component, the third direction intersecting the first direction and the second direction.

6. The electronic component unit according to claim 1, wherein the second direction is a direction from the supporting wall body to at least one of the blocks, and each of the block-side joints, while the blocks are in a state fixed to the supporting wall body via the wall-body side joints, is positioned offset towards one side from a center position of the corresponding main body portion in the second direction, the one side facing away from the supporting wall body.

7. The electronic component unit according to claim 6, wherein the blocks include two or more of the first joints and two or more of the second joints, each of the wall-body side joints is capable of engaging with and stopping any one of the first joints, each of the first joints includes an engagement projection that engages with and stops against any one of the second joints or any one of the wall-body side joints, and each of the main body portions includes a notch that penetrates through each of the main body portions in a third direction from the corresponding engagement projection towards the electronic component, the third direction intersecting the first direction and the second direction.

8. The electronic component unit according to claim 1, wherein the second direction is orthogonal to a height direction of the supporting wall body and is a direction from the supporting wall body to at least one of the blocks, the blocks include two or more of first joints, including the first joint, and two or more of second joints, including the second joint, each of the wall-body side joints is capable of engaging with and stopping any one of the first joints, each of the first joints includes an engagement projection that engages with and stops against any one of the second joints or any one of the wall-body side joints, and each of the main body portions includes a notch that penetrates through each of the main body portions in a third direction from the corresponding engagement projection towards the electronic component, the third direction intersecting the first direction and the second direction.

9. The electronic component unit according to claim 8, wherein the main body has a substantially cubic shape, the first joints are provided at one of both end surfaces of the main body in the first direction and on one of both end surfaces of the main body in the second direction, respectively, and the second joints are provided at the other of the both end surfaces of the main body in the first direction and on the other of the both end surfaces of the main body in the second direction, respectively.

10. A wire harness comprising:

an electrically conductive wiring member; and an electronic component unit electrically connected to the wiring member, wherein the electronic component unit includes:

a plurality of blocks each including at least one main body portion to each of which an electronic component electrically connected to the wiring member is attached, and a block-side joint that join any two of the blocks to each other, the blocks being joined together via the block-side joint with the main body portions arranged side by side in a first direction with gaps between adjacent ones of the main body portions, and a supporting wall body including a plurality of wall-body side joints that support and fix in a second direction intersecting the first direction, in a cantilever fashion, the blocks joined together via the block-side joint, wherein the block-side joint includes a first joint and a second joint, the first joint being capable of engaging with and stopping against the second joint and being formed in a different shape against the second joint, the first joint is formed in a recessed shape at the main body, and the second joint is formed in a raised shape at the main body.

* * * * *